US006839658B2

United States Patent
Causse et al.

(10) Patent No.: US 6,839,658 B2
(45) Date of Patent: Jan. 4, 2005

(54) SEISMIC PROCESSING WITH GENERAL NON-HYPERBOLIC TRAVEL-TIME CORRECTIONS

(75) Inventors: Emmanuel Causse, Trondheim (NO); Ketil Hokstad, Trondheim (NO)

(73) Assignee: Sintef Petroleumsforskning, Trondheim (NO)

( * ) Notice: Subject to any disclaimer, the term of this patent is extended or adjusted under 35 U.S.C. 154(b) by 57 days.

(21) Appl. No.: 10/312,557

(22) PCT Filed: Jul. 9, 2001

(86) PCT No.: PCT/NO01/00293

§ 371 (c)(1),
(2), (4) Date: Jan. 10, 2003

(87) PCT Pub. No.: WO02/06856

PCT Pub. Date: Jan. 24, 2002

(65) Prior Publication Data

US 2004/0015296 A1 Jan. 22, 2004

(30) Foreign Application Priority Data

Jul. 17, 2000  (NO) ............................................ 20003643

(51) Int. Cl.[7] .............................................. G06F 19/00
(52) U.S. Cl. ........................................ 702/182; 367/73
(58) Field of Search ............................ 702/182, 14, 17, 702/18; 367/73, 74

(56) References Cited

U.S. PATENT DOCUMENTS 4,509,150 A  *  4/1985  Davis ........................... 367/76
5,132,938 A  *  7/1992  Walters ......................... 367/38
5,570,321 A    10/1996  Bernitsas
5,671,136 A  *  9/1997  Willhoit, Jr. ................. 702/18
5,761,062 A     6/1998  Chambers
5,940,778 A     8/1999  Marfurt et al.

OTHER PUBLICATIONS

"AVO Attribute Extraction via Principal Component Analysis", Saleh, Shell International Exploration and Production Inc., 2000, 4 pages.
"Joint Estimation of AVO and Kinematic Parameters", Grion et al, European Association of Geoscientists & Engineers, 1998, pp. 405–422.

* cited by examiner

Primary Examiner—Edward Raymond
(74) Attorney, Agent, or Firm—Dennison, Schultz, Dougherty & MacDonald

(57) ABSTRACT

A method of constructing a basis of functions intended for the building of approximations of one-way or two-way seismic traveltime versus offset functions. The method is characterized by the combination of the following steps of (a) creating a distribution of reference one-way or two-way traveltime versus offset functions by traveltime modelling in a set of velocity models representing possible velocity distributions, (b) obtaining new reference functions by modifying these reference traveltime functions by applying an operator to them, (c) selecting a set of discrete offsets to make these new reference functions discrete, (d) arranging these discrete functions in columns to form a matrix, (e) applying a singular value decomposition to this matrix, with singular values sorted in decreasing order, to express its columns as linear combinations of the columns of an orthogonal matrix, and (f) building the basis functions by interpolating the columns of the orthogonal matrix.

22 Claims, 4 Drawing Sheets

SEISMIC PROCESSING WITH GENERAL NON-HYPERBOLIC TRAVEL-TIME CORRECTIONS

BACKGROUND OF THE INVENTION

The present invention concerns a method of constructing a basis of time functions intended for the building of approximations of one-way or two-way seismic traveltime versus offset functions, according to the introductory part of claim 1. The invention concerns also a method of estimating the weights of known series representing seismic traveltime versus offset, according to claims 9 and 10. The invention concerns also a method of construction a basis of functions intended for the building of approximations of seismic reflection amplitudes versus offset or seismic reflection coefficients versus angle of incidence, according to the introductory part of claims 11 and 19. The invention concerns also a method of estimating AVO attributes, according to claims 14, 18 and 22. The invention relates to methods of processing seismic data, and more particularly to methods for constructing improved basis fictions for building approximations to reflection or diffraction seismic traveltime curves and to AVO curves, and to methods for estimating the coefficients of known traveltime series and to methods for estimating AVO attributes.

Conventional seismic data-acquisition techniques involve imparting acoustic energy into the earth, either at a land surface or into the water in a marine seismic survey, and detecting at different locations the seismic signals reflected by subsurface geological boundaries (reflectors). A seismic survey involves many different source and receiver locations. The seismic signals are typically organised into gathers of traces, for instance common midpoint (CMP) gathers, where each trace in the gather is related to source-receiver pairs having the midpoint at the same location A sequence of different processing techniques is generally applied to the seismic gathers. Some of these techniques are briefly described hereafter.

Stacking consists of adding together the individual traces in the seismic gather (e.g. a CMP gather), after correction for the traveltime difference between small and larger offsets (i.e. distances between source and receiver), a process called NMO correction Traditionally, NMO correction is based on a hyperbolic approximation of the reflection traveltime t:

$$t^2(x) \cong \hat{a}_0 + \hat{a}_2 x^2, \quad (1)$$

where x represents the offset. The real traveltime of reflected signals is approached by a "best-fit" hyperbola, which means that the parameters of the hyperbola ($\hat{a}_0$ and $\hat{a}_2$) are chosen in order to obtain the best possible match between the traveltime approximation (1) and the real reflection traveltime. This can be done e.g. by maximizing the coherency (often measured by semblance) of NMO corrected signals in a time window around the event of interest, or by minimizing (e.g. by a least-squares technique or any other optimization technique) the difference between the approximation and traveltimes "picked" on the data.

Note that equation (1) becomes exact in the simplified case of an earth consisting of a single homogeneous isotropic layer over a plane horizontal reflector at depth d, with the seismic source and receivers at zero depth. In that case, we have $\hat{a}_0 = t(0)^2 = 4d^2/V^2$ and $\hat{a}_2 = 1/V^2$, where V is the compressional wave velocity. Hence, using the hyperbolic approximation consists of approximating the kinematic properties of the earth down to depth d by those of a single homogeneous "average" layer. Many other seismic processing techniques, like poststack time migration, prestack time migration and DMO use also this approximation with a single layer with average properties.

For instance, to make an image of the subsurface by zero-offset time migration of zero-offset gathers (seismic gathers where the source and receiver for each trace are coincident), each point M in the subsurface can be considered as a potential diffractor. If M is really a diffractor, located at depth d in a homogeneous layer with compressional velocity V (possibly being an "average" layer approximating the real velocity distribution in the earth), then signals must be present in the zero-offset gather along a diffraction traveltime curve t(x) given by equation (1), where x represents now the horizontal distance from the diffractor to the source/receiver pair, and with $\hat{a}_0 = t(0)^2 = 4d^2/V^2$ and $\bar{a}_2 = 4/V^2$. The signals can be aligned by using the hyperbolic diffraction traveltime correction (1) and summed (usually a weighted stack is used), resulting in a high amplitude value that can then be allocated to point M in the image. If M is not a diffractor, in contrast signals aligned using the hyperbolic diffraction traveltime correction (1) do not stack constructively, and a low amplitude value is obtained. This procedure, repeated for different locations of point M, provides an image of factors and reflectors in the ear.

Reflection traveltimes can be called "two-way" traveltimes, since they correspond to waves travelling first from the source to the reflector and then reflected up to the receivers. It is also interesting to consider "one-way" traveltimes, i.e. traveltimes of waves travelling simply from the surface (either from a source location or from a receiver location) down to a point in the earth. Diffraction traveltime curves for poststack or prestack migration can be built by combining one-way traveltime curves Our invention focuses on the construction of approximations for either one-way or two-way seismic traveltime corrections.

We have seen the importance of traveltime corrections, corresponding to both reflection and diffraction traveltimes, for seismic processing. Processing methods using such traveltime corrections may be referred to as time processing methods. We have also seen that the traveltime corrections are generally performed using an hyperbolic approximation (1), which strictly speaking is only exact in a homogeneous isotropic medium. For an inhomogeneous and/or anisotropic medium, traveltime curves are generally not hyperbolae. For instance, for a simplified earth model consisting of a stack of homogeneous plane layers, and assuming that the depth of the reflector is large compared to the maximum offset, the squared traveltime of seismic reflections can be approached by an infinite series (Taner and Koehler, 1969, Velocity spectra—digital computer derivation and application of velocity functions. Geophysics, 34, 859–881).

$$t^2(x) \cong a_0 + a_2 x^2 + a_4 x^4 + a_6 x^6 \quad (2)$$

The coefficients $a_i$, i=0, 2, 4 . . . of this series can be easily calculated from the parameters of the model, i.e the thickness and velocity of each layer, and can therefore be called "exact" or "theoretical" coefficients. On the other hand, the thickness and velocity of any layer can be obtained from the value of the exact coefficients $a_0$ and $a_2$ at the top and bottom of the layer by a simple inverse formula (Dix, 1955, Seismic velocities from surface measurements, Geophysics, 20, 68–86). The coefficients $\hat{a}_0$ and $\hat{a}_2$ of the best-fit hyperbola provide estimates of the "theoretical" coefficients $a_0$ and $a_2$ that are generally used for this purpose. This allows to build a velocity profile, i.e. to calculate the velocity as a function of depth. Repeating this procedure for different CMP gathers, a velocity model of the whole area can be obtained. This provides an input to depth processing methods like prestack and poststack depth migration. Traveltime corrections, usually using the hyperbolic approximation, are therefore important not only for time processing, but also to obtain velocity-depth models for depth processing.

Unfortunately the hyperbolic approximation (1) is inaccurate in many situations, e.g. in long-offset surveys (where the offset-to-depth ratio is much higher than in conventional surveys), for compressional to shear (P-S) reflections recorded in Ocean Bottom Seismic surveys (where the velocity model seen by the converted wave is very inhomogeneous since the wave modes are different up and down), and when the earth is anisotropic (even for a single homogeneous layer). In these cases, using the hyperbolic approximation may generate several types of problems:

- inaccuracy of the traveltime corrections, resulting in poor time processing.
- important difference between the best-fit coefficients $\hat{a}_i$ and the theoretical coefficients $a_i$. For instance, the stacking (best-fit) velocity is different from the RMS velocity (Al-Chalabi, 1973, Series approximation in velocity and traveltime computations. Geophys. Prosp., 21, 783–795). This may result in the construction of incorrect velocity profiles and models by velocity analysis.
- the values of best-fit coefficients depend on the offsets used in their estimation. Hence, if some range of offsets is not usable (This may happen for instance because of obstacles like platforms preventing acquisition of data for these offset, or due to poor data quality, e.g. at near-zero offsets in multicomponent ocean bottom data), the offset gap may reduce further the accuracy of estimates of the coefficients $a_i$.

To overcome this problem, the hyperbolic traveltime approximation may be replaced by more accurate small-offset approximations, e.g. using a quartic term $\hat{a}_4 x^4$ in addition to the first and second order terms of the hyperbolic equation (May and Straley, 1979, Higher-order velocity spectra, Geophysics, 44, 1193–1207; Hake H., Helbig K., and Mesdag C. S., 1984, Three-term taylor series for $t^2$-$x^2$-curves of P- and S-waves over layered transversely isotropic ground, Geophys. Prosp., 32, 828–850; Chambers R. E., 1998, Extended offset data processing, U.S. Pat. No. 601, 791.), or other three-term equations (Byun B. S., Corigan D., and Gaiser J. E., 1989, Anisotropic velocity analysis for lithology discrimination, Geophysics, 54, 1564–1574; Tsvankin, I. and Thomsen L., 1994, Nonhyperbolic reflection moveout in anisotropic media, Geophysics, 59, 1290–1304.). However, the accuracy of these approximations degrades at increasing offsets. In addition, there exists a trade-off between the second (quadratic) and third (quartic) terms. Therefore, the best-fit coefficients $\hat{a}_i$, i=0, 2, 4 are still different from the theoretical coefficients $a_i$, and they depend on the offset range used for the velocity analysis. This generates an uncertainty in the estimation of the parameters of individual layers, i.e. of the (possibly anisotropic) velocity model as lady pointed out by several authors (Tsvankin, I. and Thomsen L., 1995, Inversion of reflection traveltimes for transverse isotropy, Geophysics, 60, 1095–1107; Alkhalifah, T., 1997, Velocity analysis using nonhyperbolic moveout in inversely isotropic media, Geophysics, 62, 1839–1864; Grechka, V. and Tsvankin, I, 1998, Feasibility of nonhyperbolic moveout inversion in transversely isotropic media, Geophysics, 63, 957–969).

A possible approach for improving stacking at long offsets is to use a large-offset traveltime approximation (Causse, E., Haugen, G., and Rommel, B., 2000, Large-offset approximation to seismic reflection traveltimes, Geophysical Prospecting, vol. 48, no. 4, pp 763–778):

$$t(x) = c_1 x + c_0 + \frac{c_{-1}}{x} + \frac{c_{-2}}{x^2} + \frac{c_{-3}}{x^3} + \ldots \quad (3)$$

This equation is accurate at large offsets, but unfortunately inaccurate at small offsets.

To reduce the trade-off between coefficients, it is possible to decompose the squared traveltime on a basis of functions of the offset that is orthogonal:

$$t^2(x) = b_1 g_1(x) + b_2 g_2(x) + b_3 g_3(x) + \quad (4)$$

with $$\int_{x=x_{min}}^{x=x_{max}} dx g_i(x) g_j(x) = \delta_{ij}, \quad (5)$$

where $\delta_{ij}$ represents the symbol of Kronecker. An orthogonal basis of polynomial functions $g_i(x)$ can be obtained e.g. by a Gram-Schmidt orthogonalization procedure (May and Straley, 1979) or using Chebychev polynomials (Kaila K. L. and Sain K, 1994, Errors in RMS velocity and zero-offset two-way time as determined from wide-angle seismic reflection traveltimes using truncated series. Journal of seismic exploration, 3, 173–188). But these polynomial functions are not especially adapted to the particular application to seismic traveltimes. Moreover, at least three terms are needed to obtain a non-hyperbolic approximation (and therefore at least three coefficients must be estimated e.g. for the NMO correction).

Hence, there is a need for improved and more practical approximations to seismic reflection traveltime curves. The present invention proposes an answer to this need.

So far, we have only considered traveltimes. However, seismic data contain another important source of information, that is the amplitude of recorded reflected signals. Reflection amplitudes contain interesting information on reflector properties, i.e. on the value of seismic parameters just above and just below a reflector, because these parameters are involved in the expression of the reflection coefficients as a function of incidence angle. The part of seismic processing concerned with the exploration of such information contained in the amplitude of seismic reflections is generally referred to as amplitude versus offset (AVO) studies. This information can be combined for instance with lithological or petrophysical information at wells to obtain e.g. lithological or hydrocarbon indicators, or indications about the type of fluid filling porous rocks.

To extract this information from amplitudes measured on the seismic data, it is usual to start from a Taylor expansion of the exact equations for reflection coefficients. If the reflection coefficient R is expressed as a function of the ray parameter $p = \sin(\theta)/V$, where V and $\theta$ represent the velocity and the angle of incidence of the incident wave at the reflector, one obtains for instance, in the case where there is no wave conversion at the reflector, $$R(p) \approx R_0 + R_2 p^2 + R_4 p^4 + \ldots \quad (6)$$

where the coefficients $R_0$, $R_2$, . . . can be expressed as a function of the seismic parameters just below and just above the reflector (Ursin, B., and Dahl, T., 1992, Seismic reflection amplitudes, Geophysical Prospecting 40, 483–512). If a wave conversion, from P to S or S to P, occurs at the reflector, one obtains another expression:

$$R(p) \cong R_1 p + {}_3 p^3 + \ldots \quad (7)$$

where the coefficients $R_1, R_3, \ldots$ can also be expressed as a function of the seismic parameters above and below the reflector If the sine of the incident angle $\sin \theta$ is used instead of the ray parameter, one obtains similar equations $$R(\sin \theta) \cong r_0 + r_2 (\sin \theta)^2 + R_4 (\sin \theta)^4 + \ldots \quad (8)$$

and $$(\sin \theta) \cong r_1 \sin \theta + r_3 (\sin \theta)^3 + \ldots \quad (9)$$

The coefficient $r_0$ is often called intercept or zero-offset reflectivity, and $r_2$ can be called AVO gradient. These AVO attributes are widely used in the industry.

Here again, the coefficients $r_i$ can be calculated from the parameters at the reflector. Conversely, information on the seismic parameters can be obtained if one can choose coefficients $R_i$ or $r_i$ from the data. To do this, the quantity that can be measured from the data, i.e. the amplitude of seismic reflection events as a function of offset, must first be transformed into an estimate of the quantity described by the equations, i.e. the reflection coefficient as a function of the angle of incidence (or of the ray parameter). This can be done for instance by true-amplitude common-offset migration.

As soon as the function $R(\sin \theta)$ or $R(p)$ is known one can estimate coefficients $R_i$ or $r_i$ in order to obtain the best possible fit between the real curve and the approximation given by equations (6) to (9). This is often done by least-squares fitting. This procedure provides estimates of the AVO attributes ($R_i$ or $r_i$) that will be used to obtain lithological or petrophysical information.

Unfortunately, the best-fit values of the coefficients $R_i$ or $r_i$ that are estimated from the data are different from the theoretical values which are related to the useful information on seismic parameters. The first reason for this is that equations (6) to (9) are only valid close to zero-offset (corresponding to p and $\sin \theta$ equal to zero). Hence, in theory, only a few near-offset traces should be used to estimate the coefficients. On the other hand, one needs sufficiently large offsets to depict the variations of the amplitude with offset, and to have enough traces to get an acceptable signal-to-noise ratio for the estimation. In practice, the approximation errors are therefore compensated by errors in the coefficients, and the value of the coefficients will depend on the range of offsets used in the approximation. Another reason is the non-orthogonality of the basis of functions used for these approximations, e.g. (1, $p^2, p^4, \ldots$) or ($p, p^3, p^5, \ldots$). Due to this, there is a trade-off between the coefficients, and the values of the estimated coefficients depend on the number of terms used in the Taylor expansion.

Note that instead of fitting functions that represent a reflection coefficient versus the sine of the reflection angle or the ray parameter, it is possible to fit directly the amplitude A as a function of the offset x with $$A(x) \cong A_0 + A_2 x^2 + A_4 x^4 + \ldots \quad (10)$$

if there is no wave conversion at reflection, or with $$A(x) \cong A_1 x + A_3 x^3 + \ldots \quad (11)$$

for P-S or S-P conversions. The attributes $A_i$ are own used, although their are less directly related to reflector properties tan the coefficients $r_i$ or $r_i$.

Here again, the values of the coefficients estimated by least-squares optimisation differ from the theoretical values—that could be calculated if the model and reflector were known—which contain the useful information.

The present invention proposes an answer to the problems mentioned above in order to improve the accuracy of estimates of AVO attributes, and thereby the reliability of meaningful information on reflector properties, lithology, petrophysical parameters, etc, that can be extracted from seismic data.

OBJECTIVE OF THE INVENTION

The first objective of the invention is to improve seismic traveltime approximations and estimates of the coefficients parameterizing these approximations, which are generally inaccurate in the presence of anisotropy, wave conversions, long recorded offsets or offset gaps. The second objective of the invention is to improve the accuracy of estimates of the AVO intercepts and gradients and of other AVO attributes.

SUMMARY OF THE INVENTION

The first objective of the invention is met by a method having features as stated in the characterising part of claim 1. Further features are stated in the dependent claims. The traditional way of approximating traveltime curves can be viewed as a decomposition of the exact squared traveltime curves on a basis of simple polynomial or rational functions, like ($1, x^2, x^4, \ldots$) for equation (2) or ($x, 1, 1/x, \ldots$) for equation (3). These are general mathematical functions that are not particularly suited for seismic reflection traveltimes.

The present invention relates by to the building of a basis of functions of the offset that is more suitable for non-hyperbolic traveltime approximations. Some advantages of the basis built by the proposed procedure are:

it is orthogonal. This helps limiting the trade-off between coefficients. The theoretical and best-fit coefficients are closer to each other, and less sensitive to the range of recorded offsets than with a non-orthogonal basis.

the basis functions are not simple mathematical functions, but general functions of offset. A non-hyperbolic approximation is obtained even with a one or two-term equation. The basis functions are "optimally" chosen, using some a priori information, providing an accurate approximation with fewer terms that for conventional traveltime approximations.

To build the basis of functions, a distribution of possible background velocity models for the area of interest is assumed to be available (a priori information). One-way or two-way traveltime curves an modeled in each of these velocity models by any traveltime modeling technique, providing a distribution of possible traveltime curves. A set of discrete offset values is chosen. A matrix T is built such that column i of this matrix represents the traveltimes at different increasing offset values in model i, where index i spans the whole distribution of velocity models. The basis of functions of the offset is obtained by singular value decomposition of this matrix. Traveltime approximations may be obtained by linear combinations of the basis functions. All operator O may be applied to the traveltimes before building the matrix. In this case, an inverse operator may be applied to the linear combination of basis functions to obtain the traveltime approximation. The new basis functions can be expressed as a linear combination of the reference functions, which, in turn, can be expressed as a linear combination of the basis functions of other approximations, like the approximations of Taner and Koehler (1969) or of Causse et al. (2000). This provides a transformation matrix from the new basis to other bases of functions like the ones of Taner and Koehler (1969) or of Causse (2000). This way, the coefficients of the new basis, estimated by fitting the teal traveltime curve, can be transformed for instance into estimates of the Taner and Koehler (1969) coefficients or of the Causse (2000), which contain useful information about the velocity profile in the earth The second objective of the invention is met by a method having features as stated in the characterising part of claims 11,15 and 19 and in dependent claims. The most common way of extracting amplitude information from seismic data is to approximate the measured amplitudes by a Taylor expansion of the offset or to approximate the reflection coefficients by a Taylor expansion of the ray parameter or of the sine of the incidence angle. The coefficients of the approximation are generally calculated by least-squares fitting of the amplitudes or reflection coefficients obtained from the data. Because the Taylor expansion is accurate only at small offsets or incidence angles, and because it provides a non-orthogonal basis of functions, the estimated values of the attributes are different from the exact/theoretical values of the attributes. Since the link to reflector properties lies in the exact values, errors in their estimation deteriorate the useful information contained in the data.

The present invention relates secondly to the building of a basis for approximations of amplitude or reflection coefficient curves as a function of offset or of incident angle. This basis of functions is buildt using a distribution of possible reflector models or a distribution of possible earth models. By reflector model, we mean the value of the seismic parameters above and below the reflector. By earth model, we mean here a model that describes both a reflector—that is its properties, i.e. the reflector model, and its geometry—and a model of the acquisition geometry (position of source and receivers) and of the medium between the source and the reflector and between the reflector and the receivers that is sufficient to simulate the wave propagation between the source and the reflector and between the reflector and the receivers. Modelings are performed, either of the angle-dependency of the reflection coefficient for each of the reflector models, or of the offset-dependency of the amplitude of seismic signals for each of the earth models. Modeling the angle-dependency of the reflection coefficient can be done by solving simple equations, like the famous Zoepritz equations. Modeling of the offset-dependency of the amplitude of seismic signals may be done by available modeling techniques. e.g. dynamic ray tracing or finite-difference modeling.

The modeled curves for reflection coefficients of amplitudes are organized columnwise in a matrix of reference AVO functions. The AVO basis functions are provided by a singular value decomposition of this matrix. Since the matrices involved in the singular value decomposition are orthogonal, the new basis of functions is orthogonal. Because it is based on modeled AVO responses, the new basis is able to describe any reasonable AVO curve with a good accuracy. Hence, this basis of functions may solve the problems mentioned earlier, i.e. the fact that estimated coefficients are different from the exact coefficients containing the measuring information. An approximation of AVO curves is obtained by choosing proper coefficients, for instance by a least-squares fitting of the real AVO curve. The AVO basis functions cam be linearly related to the reference AVO functions, and each of the latter can be expressed by means of the usual Taylor expansion using exact/theoretical attributes calculated with the known reference models or reflector properties. Consequently, the exact/theoretical values of the usual AVO attributes can be estimated indirectly through the coefficients of the new approximation.

DETAILED DESCRIPTION OF THE INVENTION

We explain hereafter how to build a basis of functions of the offset for traveltime approximations according to the present invention.

Reference Velocity Models

We assume that a distribution of possible "reference" background velocity models is available. What we mean by background velocity model is information on the velocity and its variations in the earth, that is sufficient to describe with reasonable accuracy the kinematic of waves in the area of the seismic survey of interest and to construct one-way traveltime curves or two-way reflection traveltime curves for any potential reflector in the model. The models may be plane-layered, i.e. depend on depth z only, two-dimensional (depend on z and one lateral coordinate), or three-dimensional (depend on z and two lateral coordinates). Each model may consist of a P-wave velocity model only (acoustic model). In that case, approximations to one-way or two-way seismic traveltimes can be constructed for compressional waves (P-waves) only. The models may also contain shear wave (S-wave) velocities as well (elastic model). In this case, approximations to one-way traveltimes can be constructed for both compressional and shear waves, and approximations to two-way traveltimes can be constructed for compressional waves, shear waves and converted waves (with different wave modes on the way down and up, e.g. P-S waves). The models may also be anisotropic and attenuating, and contain more parameters than the P- and S-wave velocities.

Figure 1:
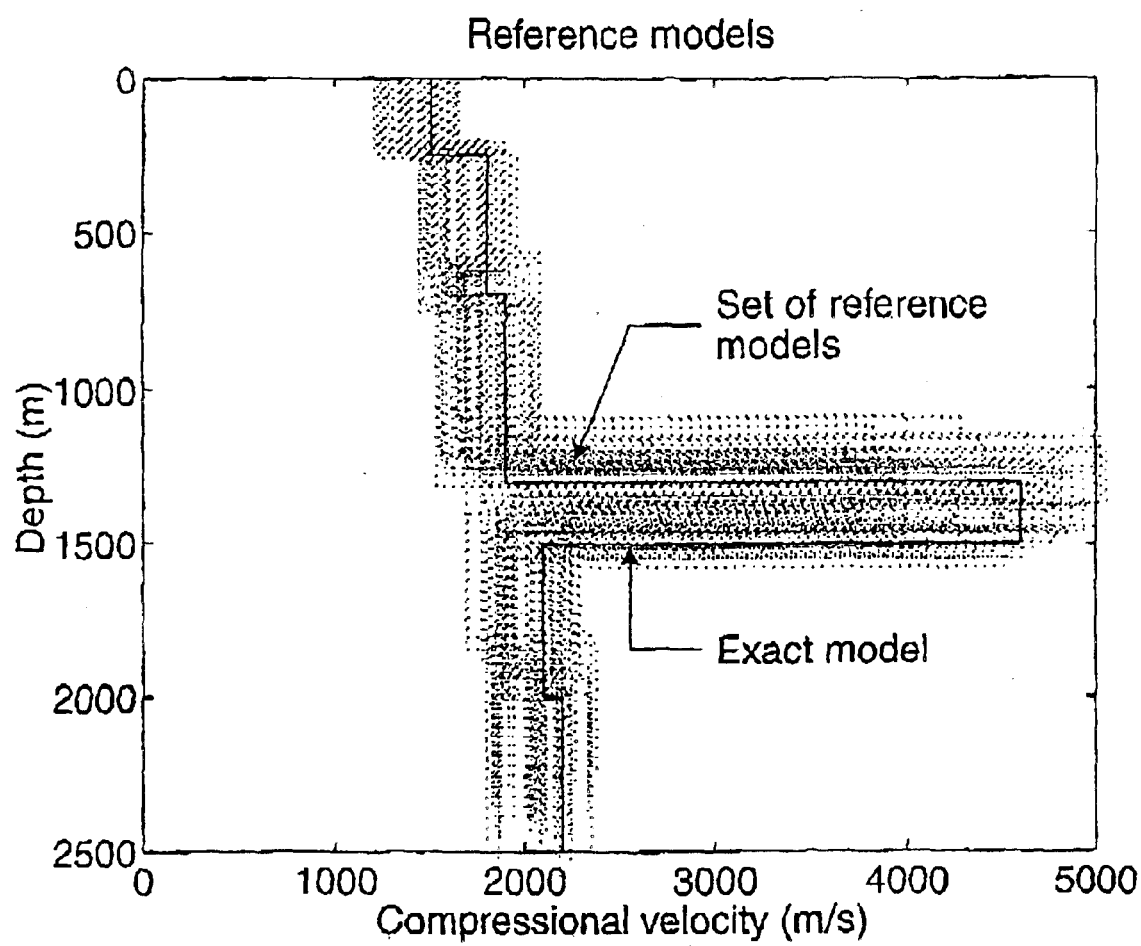
FIG. 1: exact and reference velocity models.

We can denote such a velocity model by $m_j$. The ensemble $\{m_j, j=1 \text{ to } N\}$, where N is the number of reference models, may be obtained from a priori information about the seismic velocities in the area of the survey. Some a priori information is always available. E.g. in marine seismic a good estimate of the water depth is usually available, and reasonable constraints can be put on the velocity in water and in subsurface sediments and rocks. A distribution of models can then be constructed, that respects these constants. The exact way of obtaining such a distribution is not part of the invention. We just assume that a realistic distribution of velocity models is available. FIG. 1 provides an example of distribution of plane-layer models. The "exact" model lies somewhere in the middle of the distribution.

Building of Reference Traveltime Curves

A depth interval $[z_1; z_2]$ is chosen which for instance may roughly correspond to an area of special interest in the earth. In the following, we explain how to obtain a basis of functions for approximating one-way traveltime curves down to this area, or two-way reflection traveltime curves for reflectors located in this area.

For each model $m_j$, a depth $z_j$ is chosen in the interval $[z_1; z_2]$, for instance randomly or using a suitable statistical distribution. Such a distribution can for instance be built together with the distribution of models. The traveltime $t_j(x)$ for a wave travelling in model $m_j$ is calculated. To obtain an approximation of one-way traveltimes, $t_j(x)$ is calculated for a wave travelling between a point at the surface and a depth point at depth $z_j$, and x represents the horizontal distance between the surface and depth points. To obtain an approximation of two-way reflection traveltimes, $t_j(x)$ is calculated for a wave travelling down to depth $z_j$, and reflected up by a reflector at this depth, and in this case x represents the offset. The traveltime calculations can be done using any suitable algorithm, e.g. a ray tracing algorithm or a finite-difference eikonal solver. A full waveform modeling (e.g. by a finite-difference method) followed by traveltime picking may also be used for this calculation of traveltimes. Traveltime $t_j(x)$ may represent the one-way or two-way traveltime of a P- or S-wave, or possibly the two-way traveltime of a converted wave in model $m_j$.

Figure 2:
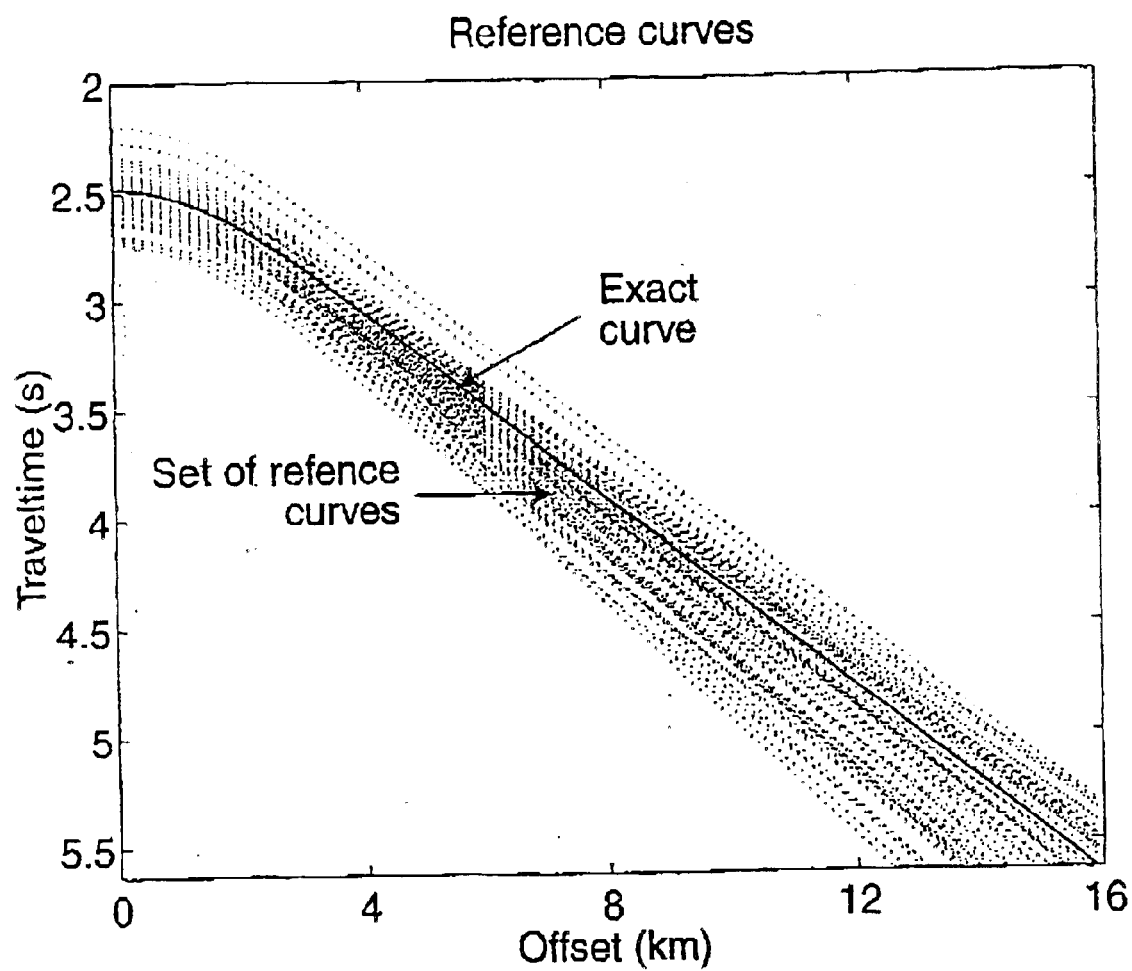
FIG. 2: exact and reference offset-traveltime functions.

We have now a set of N reference traveltime functions $t_j(x)$ representing one- or two-way traveltimes for depth $z_j$ in model $m_j$. FIG. 2 shows the traveltime curves for compressional waves reflected at the deepest reflector in each of the models shown in FIG. 1. Note that this model contains a high-velocity layer (4600 m/s), and that very large offsets are used. The exact traveltime curve (the reflection traveltime curve for the exact model) is therefore strongly non-hyperbolic in this example. FIG. 2 shows that the distortion of reference traveltime curves more or less "contains" the exact traveltime curve, even if the exact model is supposed to be unknown in this example.

Application of an Operator O to the Reference Traveltime Functions

An operator O is applied to the reference traveltime fractions $t_j(x)$. Applying an operator is not compulsory, i.e. the operator may be the identity $O[t(x)]=t(x)$ (so that $O[t_j(x)]$ represents traveltimes). However, the properties of the basis of functions to be built may be adjusted for different applications by using a suitable (linear or not) operator different from the identity. The operator may be a polynomial function, e.g. $O[t(x)]=t^2(x)$ (so that $O[t(x)]$ represents squared traveltimes), or any other suitable function $O[t(x)]=h[t(x)]$. It may be a weighting function $O[t(x)]=t(x)w(x)$ or a differential operator, e.g., $O[t(x)]=\partial t(x)/\partial x$. Other possible operators are for instance $O[t(x)]=t(x)/t(x_*)$ and $O[t(x)]=t(x)-t(x_*)$, where $x_*$ is a given offset value (e.g. $x_*=0$). Other operators, for instance combinations of the operators mentioned here may be applied. In the example chosen to illustrate the method (Figures), the operator is $O[t(x)]=t^2(x)$.

Selection of a Set of Discrete Offsets

A set of discrete offsets $\{x_i, i=1 \text{ to } M\}$ (sorted in increasing order) is selected, with M>N. The offset range spanned by the discrete offsets shall preferably include or be equal to the offset range used in the actual acquisition of the seismic data. Both negative and positive offsets may be used. The distance between consecutive offset samples may be constant or not. The set of offsets may represent the offsets used in the real acquisition or not. In the example chosen to illustrate the method, the offsets are regularly sampled with offset increments of 100 m. offset range used in the actual acquisition of the seismic data. Both Construction of a Reference Matrix T An M×N matrix T is constructed so that $$T_{ij}=O[t_j(x_i)]. \qquad (12)$$

Hence, column j of matrix T represents the reference traveltime in reference model j at all offsets $x_i$, modified by operator O. T contains information on the (modified) reference traveltimes, and will be called reference matrix. The reference traveltime curves modified by operator O, $O[t_j(x_i)]$, will be called modified reference traveltime curves.

Construction of Basis Functions $f_j(x)$

We take a singular value decomposition of the reference matrix T. This provides three matrices U, Δ and V, such that $$T_{kj} = \sum_{l=1}^{M}\sum_{n=1}^{N} U_{kl}\Delta_{ln}V_{nj}. \qquad (13)$$

U and V are orthogonal M×M and N×N matrices, respectively, and Δ is an M×N matrix which upper part is diagonal. We assume that the singular values located on the diagonal are sorted in decreasing order (i.e. $\Delta_{11}$ is the largest singular value). Let us denote by D the N×N matrix consisting of the diagonal upper part of Δ, and by F the matrix consisting of the first N columns of U. F is an M×N matrix like T. Finally, we define the N×N matrix W as $$W_{ij} = \sum_{n=1}^{N} D_{in}V_{nj}. \qquad (14)$$

We can now write $$T_{kj} = \sum_{i=1}^{N} F_{ki}W_{ij}. \qquad (15)$$

In this representation, column j of T (winch resents the modified reference traveltime curve for model j) is a linear combination of the columns of matrix F, where the weights of each column of F are given by column j of W. Because V is an orthogonal matrix, and because the singular values in D are sorted in decreasing order, the first columns of F are associated to the largest weights. Let us define $f_i(x)$ as column i of matrix F. Here, x represents the offset at the discrete values $x_j$. The functions $f_i(x)$, i=1, N represent a base of orthogonal functions spanning the space defined by the modified reference traveltime curves at discrete offsets $x_j$. Moreover, the first function $f_1(x)$ represents the most important component in all modified reference traveltime curves (since it is associated to the largest singular value), the second function $f_2(x)$ is the second most important component, and so on.

Traveltime Approximation

The exact traveltime curve $t(x)$ we seek to approximate, modified by operator O, can be approximated by an equation having the following form:

$$O[t(x)] \approx b_1f_1(x)+b_2f_2(x)+b_3f_3(x)+ \ldots \qquad (16)$$

To obtain au approximation at any offset x in the offset range spanned by the discrete offsets $x_j$, the basis functions $f_i$ are interpolated between the discrete offset values by any suitable interpolation. technique, e.g. linear interpolation According to equation (15), any of the reference modified traveltime curves is exactly equal to a linear combination of all of the N basis functions $f_i(x)$. However, in this linear combination, the functions associated to small singular values play a minor role and can be neglected. This means that a very good approximation to any of the reference modified traveltime curves $O[t_j(x)]$ can be obtained using only the L first basis functions $f_i(x)$ (L≦N). Hence, if the reference traveltime curves $t_j(x)$ are chosen properly, we can expect that an L-term approximation in the form of equation

(16) can provide a very good approximation to the exact modified traveltime curve $O[t_j(x)]$ as well. To obtain an approximation of the traveltime curve instead of the modified traveltime curve, the effect of operator O must be removed. If the chosen operator is invertible, its inverse $O^{-1}$ can be applied, and we obtain a traveltime approximation of the following form:

$$t(x) \approx O^{-1}[b_1 f_1(x) + b_2 f_2(x) + b_3 f_3(x) + \ldots]. \tag{17}$$

Figure 3:
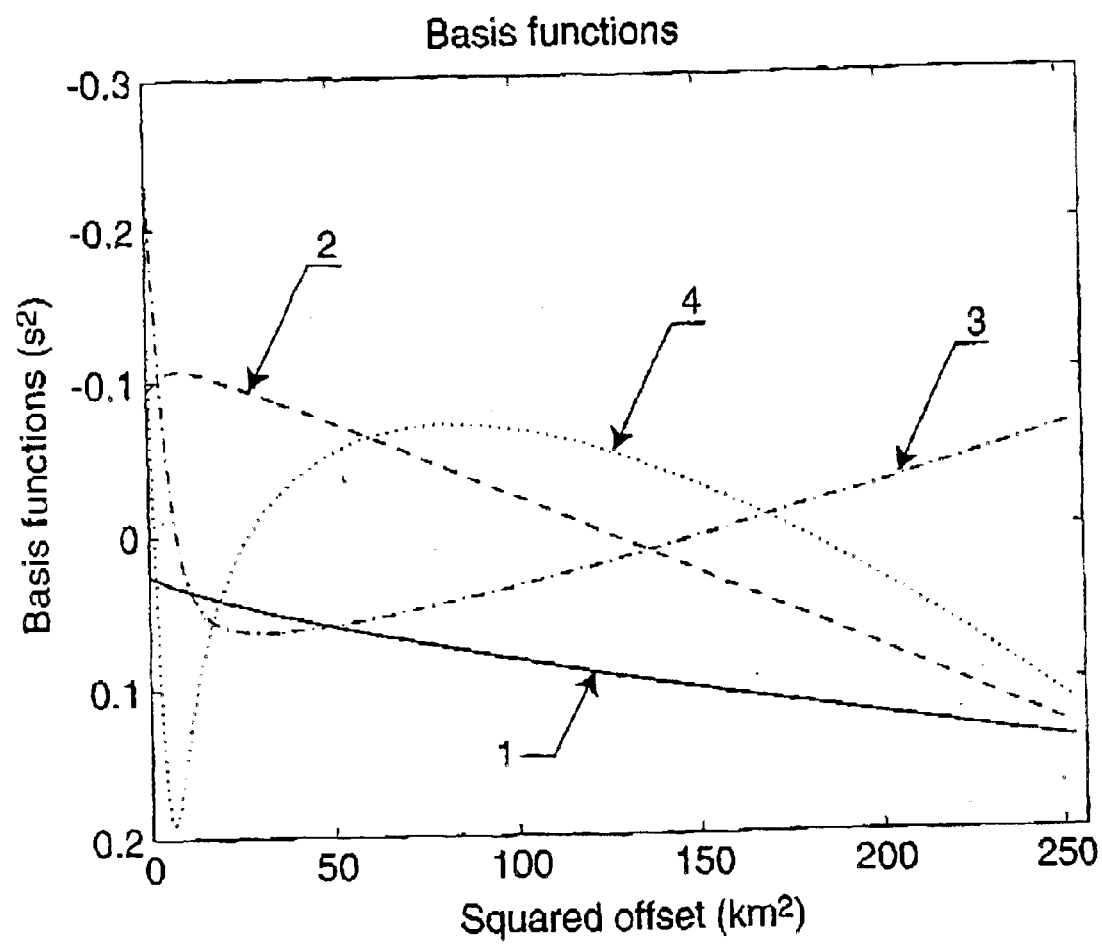
FIG. 3: the four first functions $f_i$ (i=1 to 4) as a function of squared offset.
Figure 4:
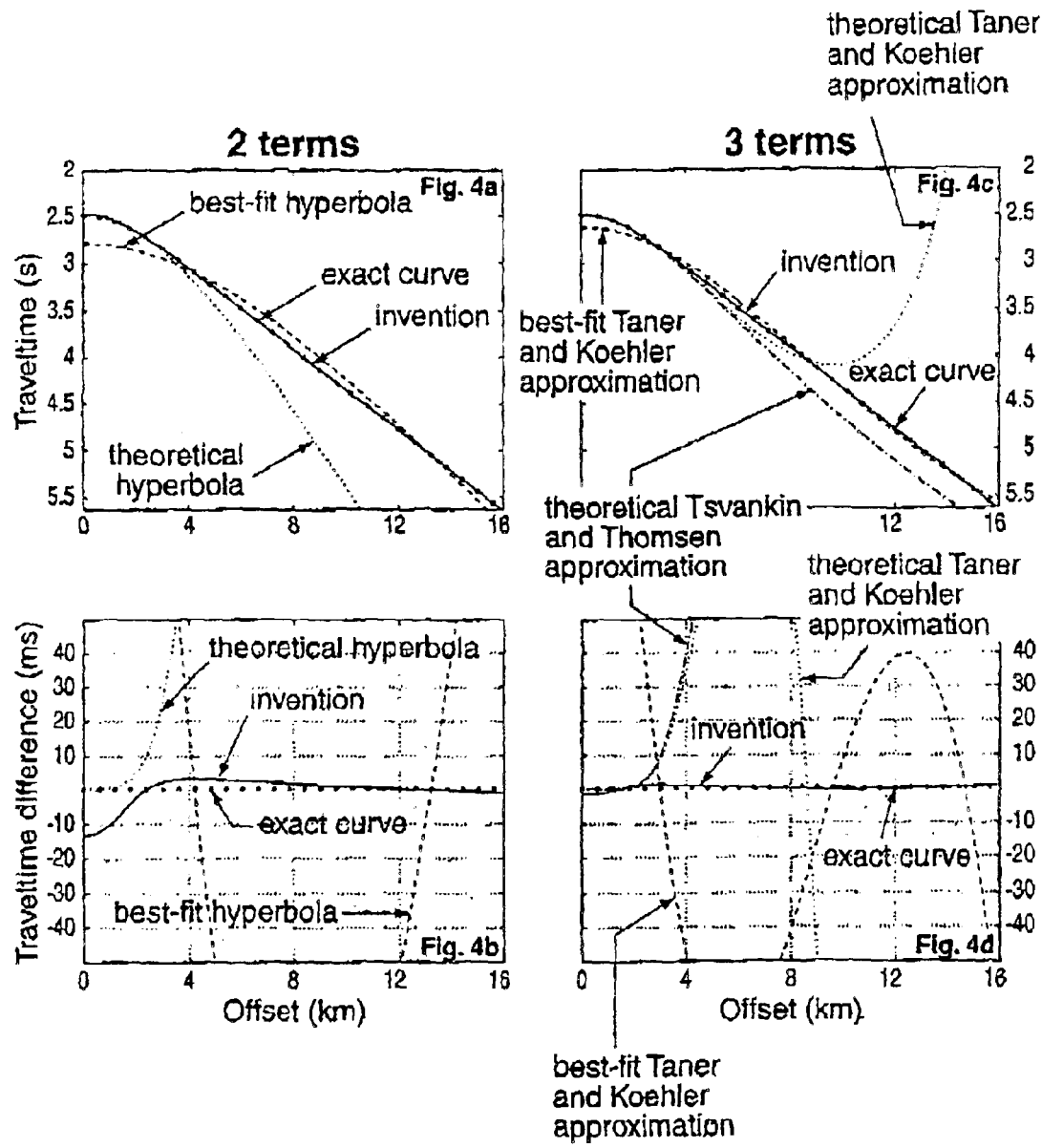
FIG. 4: two-term (FIGS. 4a and 4b) and three-term (FIGS. 4c and 4d) traveltime approximations (FIGS. 4a and 4c) and traveltime residuals, i.e. the difference between the approximation and the exact traveltimes (FIGS. 4b and 4d), obtained with the conventional approach (i.e. the Taner and Koehler equation (2) with two and three terms, and the three-term equation of Tsvankin and Thomsen (1994)) and with the present invention.

Equation (17) represents an approximation of the one-way or two-way traveltime curve that is parametrized by coefficients $b_1$, $b_2$, $b_3$, . . . This represents an alternative to conventional traveltime approximations, e.g. to equation (2), parametrized by coefficients $a_0$, $a_1$, $a_2$, . . . To build an approximation of the exact traveltime curve of interest, the coefficients $b_i$ in equation (17) must be chosen properly, e.g. using similar techniques to the ones used for estimating the coefficients $a_i$ in equation (2). FIG. 3 shows the first four basis functions. They represent squared traveltime, and are plotted here as a function of the squared offset. FIG. 4 shows the approximate traveltime curves obtained with a two-term approximation (FIGS. 4a and 4b) and a three-term approximation (FIGS. 4c and 4d). The exact traveltimes were obtained by ray tracing in the exact model in FIG. 1. For the modified three-term equation of Tsvankin and Thomsen (1994), we took the horizontal velocity (which is involved in the expression of one of the coefficients) equal to the highest velocity in the model (i.e. 4600 m/s). The coefficients $b_i$ are best-fit coefficients that minimize the least-squares error between the exact traveltime curve and the approximations. The best-fit Taner and Koehler approximation (which is a hyperbola if two terms only are used) is plotted for comparison, The best-fit coefficients of this approximation were also calculated by least-squares minimization. Approximations obtained with theoretical coefficients (i.e. calculated directly assuming the exact model is known) are also shown for comparison. To highlight the accuracy of the different traveltime approximations, the difference between the exact traveltime and the approximations is plotted in the lower panels of the figure.

Note that with the traditional approaches shortly described previously, the traveltime curves obtained with one and two terms are a straight line and a hyperbola, respectively. With the approach proposed here, the one-term stacking curve is a non-hyperbolic traveltime approximation with a shape corresponding more or less to the average shape of all the reference traveltime functions. Including a second term helps refining this approximation by reducing the difference between the exact curve and the "average" curve.

If the operator O is not invertible, the inverse operator $O^{-1}$ does not exist, and equation (17) cannot be used. Examples of such operators are $O[t(x)]=t(x)/t(x^*)$ and $O[t(x)]=t(x)-t(x^*)$. With these operators, we may find two functions $t_1$ and $t_2$ such that $t_1(x) \neq t_2(x)$ and $O[t_1(x)]=O[t_2(x)]$. To recover the original function $t(x)$ from $O[t(x)]$, it is sufficient to multiply with a constant $t(x^*)$ and add a constant $t(x^*)$, respectively, but the value of the constant can not be obtained directly from $O[t(x)]$. In this case, this constant can be considered as an unknown coefficient that can be estimated like the other coefficients of the approximation. For instance, if operator $O[t(x)]=t(x)/t(x^*)$ has been chosen, a traveltime approximation of the form $$t(x) \approx b_0(b_1 f_1(x) + b_2 f_2(x) + b_3 f_3(x) + \ldots \tag{18}$$

can be used and if operator $O[t(x)]=t(x)-t(x^*)$ has been chosen, a traveltime approximation of the form $$t(x) \approx b_0 + b_1 f_1(x) + b_2 f_2(x) + b_3 f_3(x) + \ldots \tag{19}$$

can be used. In these cases, the multiplication or addition with $b_0$ can be considered as the application of an estimated "pseudo-inverse operator". Hence, even if the operator O applied to the reference traveltime functions is non invertible, the basis functions $f_i$ can be used to build a traveltime approximation, with a form slightly different from equation (17).

We explain hereafter how to build a basis of functions for approximations of the reflection coefficient as a function of the angle of incidence. Usually the angle of incidence $\theta$ is represented indirectly by it sine $\sin \theta$ or by the ray parameter $p=\sin \theta/V$, where V represents the velocity of the incident wave. In the following explanations we use the ray parameter p although any other representation of the angle of incidence may be used instead Reference AVO Models We assume that a distribution of K possible reference "reflector models" is available, that may be built e.g. from a priori information about the area of interest. By reflector model, we mean the value of the seismic parameters above and below the reflector. The seismic parameters involved can include densities, and P- and S-wave velocities, but also anisotropy or attenuation parameters or other relevant parameter having an influence on reflection coefficients. Any subset of the parameters mentioned here can also be used, that is sufficient to express the variation of the reflection coefficient with the ray parameter for any type of seismic wave of interest for seismic exploration.

Building of Reference AVO Curves

We choose a particular wave mode, and for each reflector model we calculate the reflection coefficient as a function of the ray parameter for this wave mode, using expressions available in the literature (e.g. Cervený, V., 1995, Seismic wave fields in three-dimensional isotropic and anisotropic structures, Lecture notes, University of Trondheim). The reflection coefficients calculated may correspond to P—P reflections, P-SH reflections (SH meaning horizontally polarized shear-wave), P-SV reflections (SV meaning vertically polarized shear-wave), SV—SV or any other combination of wave modes for the incident and reflected waves. We obtain this way a set of K reference AVO curves.

Selection of a Set of Discrete Ray Parameter Values

A set of discrete ray parameter values is selected. This can be chosen for instance in order to cover the range of incidence angles at reflectors for a particular seismic survey. One may choose the values so that postcritical angles (angles larger than the critical angle) will be covered or not.

Construction of a Reference AVO Matrix

A reference AVO matrix is built such that its first column corresponds to the values of the first reference AVO curve for each discrete value of the ray parameter, the second column correspond to the second reference AVO curve, etc.

Construction of the AVO Basis Functions

We take a singular value decomposition of the reference AVO matrix. We obtain the reference AVO matrix as a product of three matrices. The K first columns of the first matrix represent the value of the AVO basis functions for each of the discrete ray parameter values. The functions obtained this way can be interpolated to obtain their values for other values of the ray parameter than the discrete values previously selected.

Approximations of AVO Curves

To approximate an exact AVO curve describing the reflection coefficient for any type of incident and reflected wave at a real reflector, we use the basis of functions corresponding to the same combination of incident and reflected wave modes. The approximation is obtained by a least-squares fitting of the exact curve with a linear combination of the L first basis functions, with L≦K. Since the basis functions are specially designed for AVO curves, a very good approximation is obtained this way.

Estimation of AVO Attributes

The singular value decomposition expresses the K reference AVO curves as a linear combination of the K AVO basis functions. By inversing this relation, we express the K AVO basis functions as a linear combination of the K reference AVO functions. Each of the reference AVO functions can be easily expressed as a linear combination of the basis functions $(1, p^2, p^4, \ldots)$ or $(p, p^3, p^5, \ldots)$ (depending on the wave modes involved), where the coefficients of the linear combination for the $i^{th}$ AVO reference function can be calculated from the seismic parameters for the $i^{th}$ reflector model, using expression known from the literature (e.g. Ursin, B. and Dahl, 1992). Using these linear combinations, we obtain an expression of each AVO basis function as a linear combination of functions $(1, p^2, p^4, \ldots)$, or $(p, p^3, p^5, \ldots)$.

Since we have approximated our re AVO curve by a linear combination of the AVO basis functions, we can use the expression just obtained and rewrite our approximation of the real AVO curve as a linear combination of the functions $(1, p^2, p^4, \ldots)$ or $(p, p^3, p^5, \ldots)$. The coefficients of the linear combination provide estimates of different attributes. For instance, if a pure wave mode was used, we have rewritten our approximation of the real AVO curve as a weighted sum of the functions $1, p^2, p^4$, etc. In this case, the weight we have obtained for function 1 corresponds to the AVO intercept, while the weight of function $p^2$ corresponds to the AVO gradient.

Applications

We describe hereafter some possible applications of the new basis of functions for traveltime approximations.

Time Processing

We have conducted a basis of orthogonal functions for seismic traveltime approximations. These approximations can be used to perform any of the seismic processing operations requiring traveltime approximations, like stacking, DMO, postack migration, prestack migration, etc. These processing methods often use hyperbolic traveltime approximations. In essence, this means that the exact velocity model down to depth z is replaced by a single (homogeneous isotropic) layer with average kinematic properties described by $t(0)$ and $V_{RMS}$. In comparison, the new approximation allows to replace the exact velocity model down to depth z by a single layer whose kinematic properties are described by the coefficients $b_i$ in equation (17), which more accurately approaches the real kinematics of seismic waves in the area of the survey. Most existing time processing methods can therefore be updated and improved by using the new approximations.

Velocity Analysis

Another interesting application which deserves some additional explanations is velocity analysis. As already pointed out, the coefficients $a_0$ and $a_2$ of equation (2) can be used to retrieve the layer thicknesses and velocities of a plane-layered medium. Coefficient $a_4$ provides additional information about anisotropy (Alkialifah T. and Tsvankin I., 1995. Velocity analysis for transversely isotropic media. Geophysics, 62, 1550–1566). We have shown that usually the best-fit coefficients $\hat{a}_i$ are used as estimates of the coefficients $a_i$ in this procedure, and that this can lead to errors, since these estimates may be poor. We explain here how the invention allows to obtain new estimates $\hat{a}_i$ of the coefficients $a_i$. We assume that the procedure for building functions $f_i$ has been followed, with operator $O[t(x)]=t^3(x)$. In this case, the modified reference curves represent the squared reference traveltimes. We also assume best-fit coefficients $\hat{b}_i$ have been estimated to obtain a traveltime approximation in the form of equation (17). We show here how these coefficients $\hat{b}_i$, (for i=0, 2, 4 . . . ) can be transformed into estimates of the "theoretical" coefficients $a_i$ (for i=1, 2, 3 . . . ).

We have expressed the modified traveltime reference functions as a linear combination of the basis functions $f_i(x)$ (equation (15)). Inversely, each of the basis functions $f_i(x)$ can be expressed as a linear combination of the modified traveltime reference functions. Since we know the models used to generate these traveltime curves, we can approximate the squared traveltime reference functions using the Taner and Koehler equation (2) with as many terms as we wish, and with theoretical coefficients directly calculated from the known model parameters. Hence, as soon as we have approximated the exact squared traveltime curve by a linear combination of the basis functions $f_i(x)$, we also obtain it as an approximate linear combination of the basis functions $1, x^2, x^4, \ldots$ of the Taner and Koehler equation (2). Note that using equation (17) with one term only, we already have an estimate of all possible coefficients $a_i$. The NMO velocity can for instance be estimated even when using a one-term approximation, and the quartic coefficient $a_4$ can be estimated using an approximation with one or two terms only.

To establish the link between the coefficients $\hat{b}_i$ (i=1, 2, 3 . . . ) and $a_i$ (i=0, 2, 4 . . . ), we start by calculating the theoretical coefficients of the Taner and Koehler series, $a_{0j}, a_{2j}, a_{4j}, \ldots$ from the known model j. An approximation of reference curve j may be obtained by keeping the L first terms of this series. Doing this for every reference curve, we define an L-by-N matrix A of "theoretical" Taner and Koehler coefficients by $A_{ij}=a_{2(i-1),j}$, where index i goes from 1 to L, and index j from 1 to N. In matrix form, the L-term Taner and Koehler approximation (2) of the whole set of reference curves can be written $$T_{kj} \simeq \sum_{i=1}^{L} X_{ki} A_{ij}, \quad (20)$$

where X is a matrix such that its column i contains the offsets raised to the power of $2(i-1)$, i.e the first column contains only ones, the second column represents the squared offsets $x_k^2$, k=1, M, and so on. These columns represent the traditional basis functions of the Taner and Koehler series. The traveltime approximation (2) with exact (unknown) coefficients $a_i$ can be written as $$t(x_k)^2 \simeq \sum_{i=1}^{L} X_{ki} a_{2(i-1)}. \quad (21)$$

The new traveltime approximation (16), with K terms (K<N) involving estimated coefficients $\hat{b}_i$, writes $$t(x_k)^2 \simeq \sum_{i=1}^{K} F_{ki} \hat{b}_i, \quad (22)$$

From equations (15) and (14), and using the fact that $V^{-1}=V^T$, we have $$F_{ki} = \sum_{n=1}^{N}\sum_{j=1}^{N} T_{kn} V_{nj}^T D_{ji}^{-1} \qquad (23)$$

Using this expression together with equation (20), equation (22) can be rewritten $$t(x_k)^2 \simeq \sum_{l=1}^{L}\sum_{n=1}^{N}\sum_{j=1}^{N}\sum_{i=1}^{K} X_{kl} A_{ln}(V^T)_{nj}(D^{-1})_{ji} \hat{b}_i. \qquad (24)$$

Comparing with equation (21), we finally obtain a new estimate of the coefficients in the Taner and Koehler series, as a function of the K coefficients $\hat{b}_i$, $i=1, K$:

$$\bar{a}_{2(l-1)} = \sum_{n=1}^{N}\sum_{j=1}^{N}\sum_{i=1}^{K} A_{ln}(V^T)_{nj}(D^{-1})_{ji} \hat{b}_i. \qquad (25)$$

Since the functions $f_i(x)$ are orthogonal, the coefficients $\hat{b}_i$ me in theory independent on each other (strictly speaking, this is valid only if the coefficients are estimated by minimizing the least-squares error between the approximate and exact traveltimes modified by operator O). This may simplify the search for optimal coefficients. Another consequence is that the "best-fit" and theoretical coefficients $\hat{b}_i$ and $b_i$ are in principle equal. In particular, the coefficients $\hat{b}_i$ should be more or less independent on the offset range used to estimate them (at least in a noise-free situation), or on the presence of possible offset gaps. Therefore, the estimation of coefficients $a_i$ using this procedure represents an interesting alternative to conventional velocity analysis which may enable to reduce uncertainties in the estimation of interval thicknesses, velocities, and other parameters (e.g. related to anisotropy). Tables 1 and 2 illustrate the estimation of the coefficients $a_i$ by least-squares fitting of the Taner and Koehler equation and by the procedure using tile invention, for the example shown in the Figures.

TABLE 1

Percentage error in coefficients $\hat{a}_i$ estimated by least-squares fitting of the Taner and Koehler series (using the whole offset range).

| terms | 1 | 2 | 3 | 4 |
|---|---|---|---|---|
| $a_0$ | 165 | 26 | 11 | 5.3 |
| $a_2$ |  | −56 | −40 | −27 |
| $a_4$ |  |  | −86 | −57 |

TABLE 2

Percentage error in coefficients $\bar{a}_i$ estimated using the new method.

| terms | 1 | 2 | 3 | 4 |
|---|---|---|---|---|
| $a_0$ | −4.3 | −1.2 | −0.08 | 0.003 |
| $a_2$ | 4.8 | 7.2 | 1.6 | −0.07 |
| $a_4$ | 25 | 42 | 17 | −0.31 |

A similar procedure can be applied to estimate the coefficients $c_i$ in equation (3). In this case, the reference matrix should contain traveltimes rather than squared traveltimes (because equation (3) represents traveltimes), i.e. the operator O should be equal to the identity. The coefficients $c_i$ can be calculated if the velocity model is known (Causse, Haugen and Rommel, 2000). Therefore, estimates of these coefficients provide information on the velocity model. Estimates of the coefficients of other types of traveltime approximations may be related in a similar way to the coefficients $b_i$ of traveltime approximations using the basis functions of the invention.

Other Applications

The invention allows to construct efficiently parameterized approximate traveltime curves. From these traveltime curves, other quantities of interest can be calculated, like the geometrical spreading L, the slowness vector $\vec{p}$ and the polarsation vector $\vec{g}$. These quantities are related to the traveltimes through equations involving partial derivatives of the traveltimes (see e.g. Hokstad, K., 1999, Elastic imaging of multicomponent seismic data, PhD thesis, The Norwegian Institute for Science and Technology). The partial derivatives may be calculated by analytical or numerical derivation of the traveltime curves. Hence, the invention can be used indirectly to calculate approximations of other quantities than traveltimes, which are very useful for seismic processing:

geometrical spreading approximations can be used to apply amplitude corrections to migration images in order to obtain so called "true-amplitude" migration. The migration images then represent the angle-dependent reflectivity of the imaged geological interfaces.

approximations of the polarisation vectors can be used for correctly migrating multicomponent data (e.g. Ocean Bottom Seismic data or Vertical Seismic Profile data.), where the particle velocity in three orthogonal directions is measured instead of the pressure. In this case, the data are represented by a vector rather than a scalar, and the polarisation are necessary to know how the data vector projects onto the different directions.

the slowness vector can be used to calculate the ray parameter (horizontal projection of the slowness vector). The ray parameter is related to the angle of incidence of the rays at reflectors, via a very simple relation if the medium is plane layered. The calculated angles can be used to perform common-angle migration, or the ray parameter can be used directly to perform constant-ray-parameter migration (see e.g. Thiery, Lambaré and Alérini, 1999, Angle-dependent reflectivity maps via 3D migration/inversion—an opportunity for AVA, 61st EAGE Conference, Expanded Abstracts, 4–51). The approximate angles or ray parameters may also be used to establish the link between offsets and angles.

Combining approximations of the geometrical spreading and of the slowness vector, one can obtain the reflectivity of geological interfaces as a function of incident angle or ray parameter. It is then possible to perform a so called AVO (amplitude versus offset) or AVA (amplitude versus angle) analysis, where the angle-dependent reflectivity is used to estimate important lithological or petrophysical parameters.

Note that the invention has been explained for seismic data represented in the t-x (traveltime-offset) domain. Although this is the most usual way of representing seismic data, these are sometimes transformed into another domain, for instance the r-p (intercept time-ray parameter) domain (e.g. Stoffa, Buhl, Diebold and Wenzel, 1981, direct mapping of seismic data to the domain of intercept time and ray parameter—a plane wave decomposition, Geophysics, 46, 255–1267)). Some processing methods cam be applied to the data in the new domain. The data may possibly be transformed back into the traveltime-offset domain by an inverse transform. The principle of the invention may be applied to any other domain where traveltime curves can be represented.

What is claimed is:

1. A method of constructing a basis of functions intended for the building of approximations of one-way or two-Way seismic traveltime versus offset functions, the method being characterised by the combination of the following steps:
   (a) Creating a distribution of reference one-way or two-way traveltime versus offset functions by traveltime modelling in a set of velocity models representing possible velocity distributions,
   (b) obtaining new reference functions by modifying these reference traveltime functions by applying an operator O to them,
   (c) selecting a set of discrete offsets to make these new reference functions discrete,
   (d) arranging these discrete functions in columns to form a matrix,
   (e) applying a singular value decomposition to this matrix, with singular values sorted in decreasing order, to express its columns as linear combinations of the columns of an orthogonal matrix, and
   (f) building the basis functions by interpolating the columns of the orthogonal matrix.

2. A method for constructing a basis of functions as described in claim 1, characterised by the reference traveltime curves also being a function of the azimuth, i.e. the angle between the north-south direction and the x-axis along which the offset is measured.

3. A method for constructing approximations to seismic traveltimes by taking a linear combination of basis function according to claim 1, and applying to this linear combination the inverse of the operator O used to create the basis functions, if this operator has an inverse.

4. A method to calculate the exact weights of the series of Taner and Koehler (1969) as a linear combination of optimal weights of the traveltime approximation of claim 3, with operator O representing a squaring of the reference traveltime functions.

5. A method for constructing approximations to seismic traveltimes, characterised by taking a linear combination of basis functions according to claim 1, and applying to this linear combination a pseudo-inverse operator.

6. A method for NMO correction of seismic reflected signals, comprising;
   (a) Creating a distribution of reference one-way or two-way traveltime versus offset functions by traveltime modelling in a set of velocity models representing possible velocity distributions,
   (b) obtaining new reference functions by modifying these reference traveltime functions by applying an operator O to them,
   (c) selecting a set of discrete offsets to make these new reference functions discrete,
   (d) arranging these discrete functions in columns to form a matrix,
   (e) applying a singular value decomposition to this matrix, with singular values sorted in decreasing order, to express its columns as linear combinations of the columns of an orthogonal matrix, and
   (f) building the basis functions by interpolating the columns of the orthogonal matrix, and applying to this linear combination the inverse of the operator O used to create the basis functions, if this operator has an inverse, characterised by the weights of the different basis functions in the linear combination being chosen to obtain the best possible NMO correction of the different recorded reflected signals.

7. A method for NMO correction of seismic reflected signals of claim 6, characterised by the pseudo-inverse operator and the weights of the different basis functions in the linear combination being chosen to obtain the best possible NMO correction of the different recorded reflected signals.

8. The method of claim 7, characterised by several different sets of basis functions being used for the NMO correction of recorded seismic signals in a gather, reflected from different depth intervals.

9. The method of claim 6, characterised by several different sets of basis functions being used for the NMO correction of recorded seismic signals in a gather, reflected from different depth intervals.

10. A method to calculate the exact weights of the series of Causse, Haugen and Rommel (2000) as a linear combination of optimal weights of the traveltime approximation comprising;
    (a) Creating a distribution of reference one-way or two-way traveltime versus offset functions by traveltime modelling in a set of velocity models representing possible velocity distributions,
    (b) obtaining new reference functions by modifying these reference traveltime functions by applying an operator O to them,
    (c) selecting a set of discrete offsets to make these new reference functions discrete,
    (d) arranging these discrete functions in columns to form a matrix,
    (e) applying a singular value decomposition to this matrix, with singular values sorted in decreasing order, to express its columns as linear combinations of the columns of an orthogonal matrix, and
    (f) building the basis functions by interpolating the columns of the orthogonal matrix, and applying to this linear combination the inverse of the operator O used to create the basis functions, if this operator has an inverse, with operator O equal to the identity.

11. A method of constructing a basis of functions intended for the building of approximations of reflection coefficients versus the ray parameter p, the method being characterised by the combination of the following steps:
    (a) Creating a distribution of reference AVO curves expressing variations of the reflection coefficient with the ray parameter p for a reflection by calculating the exact reflection coefficient versus ray parameter functions, for a distribution of reflector models with reasonable properties (i.e. that have a reasonable chance to be present in a real situation),
    (b) selecting a set of discrete ray parameter to make these AVO reference curves/functions discrete,
    (c) arranging these discrete functions in columns to form a matrix,
    (d) applying a singular value decomposition to this matrix, with singular valves sorted in decreasing order, to express its columns as linear combinations of the columns of an orthogonal matrix, end
    (e) building the basis functions by interpolating the columns of the orthogonal matrix.

12. A method for constructing approximations to reflection coefficients as a function of ray parameter by taking a linear combination of basis functions according to claim 11.

13. A method to approximate a real curve representing the reflection coefficient as a function of the ray parameter with an approximation according to claim 12, with the weights of the linear combination optimally chosen to obtain an optimal fitting of the real curve by the approximation.

14. A method to calculate the theoretical attributes of a Taylor expansion of the reflection coefficient as a function of the ray parameter, as a linear combination of the optimal coefficients of the approximation of claim 13.

15. The method as in claim 14, but where the ray parameter is replaced by the sine of the reflection angle.

16. The method as in claim 12, but where the ray parameter is replaced by the sine or this reflection angle.

17. The method as in claim 16, but where the ray parameter is replaced by the sine of the reflection angle.

18. The method as in claim 11, but where the ray parameter is replaced by the sine of the reflection angle.

19. A method of constructing a basis of functions intended for the building of approximations of seismic reflection amplitudes versus the offset x, the method being characterised by the combination of the following steps:

(a) Creating a distribution of reference curves expressing the amplitude of seismic events with offset x for a reflection by modeling in a distribution of realistic models providing sufficient information to describe the propagation of waves from the source down to a given reflector, the reflection of the waves at this reflector, and the propagation of the waves from this reflector to the receivers, (c) selecting a set of discrete offsets to make these reference curves/functions discrete, (d) arranging these discrete functions in columns to form a matrix, (e) applying a singular value decomposition to this matrix, with singular values sorted in decreasing order, to express its columns as linear combinations of the columns of an orthogonal matrix, and (f) building the basis functions by interpolating the columns of the orthogonal matrix.

20. A method for constructing approximations to reflection amplitudes as a function of offset by taking a linear combination of basis functions according to claim 19.

21. A method to approximate a real curve representing the reflection amplitude as a function of the offset with an approximation according to claim 20, with the weights of the linear combination optimally chosen to obtain an optimal fitting of the real curve by the approximation.

22. A method to calculate the theoretical. attributes of a Taylor expansion of the reflection amplitude as a function of the offset, as a linear combination of the optimal coefficients of the approximation of claim 21.

* * * * *